United States Patent
Rylander et al.

(10) Patent No.: US 6,562,236 B2
(45) Date of Patent: May 13, 2003

(54) SEWAGE TREATMENT SYSTEM

(76) Inventors: Carl B. Rylander, 4299 Percheron Dr., Arcata, CA (US) 95521; Theodore E. Anvick, 5700 Carbon Canyon Rd., Space 55, Brea, CA (US) 92823

( * ) Notice: Subject to any disclaimer, the term of this patent is extended or adjusted under 35 U.S.C. 154(b) by 0 days.

(21) Appl. No.: 09/854,442

(22) Filed: May 14, 2001

(65) Prior Publication Data

US 2002/0166812 A1 Nov. 14, 2002

(51) Int. Cl.[7] .................................................. C02F 3/00
(52) U.S. Cl. ........................ 210/605; 210/747; 210/170; 210/532.2; 210/919; 210/920
(58) Field of Search ................................ 210/605, 630, 210/747, 170, 253, 532.2, 919, 920

(56) References Cited

U.S. PATENT DOCUMENTS

| | | | |
|---|---|---|---|
| 3,526,589 A | | 9/1970 | Meller et al. ................. 210/77 |
| 3,730,884 A | * | 5/1973 | Burns et al. ................ 210/170 |
| 3,875,051 A | | 4/1975 | Kovarik ...................... 210/170 |
| 4,501,665 A | * | 2/1985 | Wilhelmson ............. 210/532.2 |
| 4,594,153 A | * | 6/1986 | Weis ........................... 210/170 |
| 4,824,572 A | * | 4/1989 | Scott ........................... 210/747 |
| 4,919,814 A | | 4/1990 | Carnahan et al. ........... 210/603 |
| 5,192,426 A | * | 3/1993 | DeCoster .................... 210/170 |
| 5,342,523 A | * | 8/1994 | Kuwashima ................ 210/605 |
| 5,895,569 A | * | 4/1999 | Connelly ................. 210/532.2 |

* cited by examiner

*Primary Examiner*—Christopher Upton
(74) *Attorney, Agent, or Firm*—Richard L. Myers; Myers Dawes Andras & Sherman LLP

(57) ABSTRACT

A source of sewage is coupled to a septic tank by an influent line. The outlet line is coupled to a sewage treatment plant by an outlet line. Sewage travels from the source to the septic tank where solid matter is filtered. Liquid matter passes through the septic tank into the outlet line where it transported to the sewage treatment plant to be treated. The outlet line may consist of an indefinite number of intermediary lines and valves, such as an effluent line adjacent to the septic tank, a distribution line adjacent to the sewage treatment plant, and a valve disposed in between the effluent line and the distribution line. The valve may be coupled to a leach field so that liquid matter traveling from the effluent line to the valve may be directed either to the leach field or the distribution line leading to the sewage treatment plant. The invention also comprises methods of retrofitting existing sewage systems to include a septic tank coupled to a sewage treatment plant, thereby alleviating demand on any existing leach fields as well as the sewage treatment plant.

6 Claims, 4 Drawing Sheets

SEWAGE TREATMENT SYSTEM

BACKGROUND OF THE INVENTION

1. Field of the Invention

The invention relates generally to systems for the transport and treatment of sewage.

2. Description of Prior Art

Two types of sewage treatment systems currently exist. The first is a sewage treatment plant system found most commonly in cities and more densely populated areas. The other is a septic tank system used in more rural and less populated areas. Each system has its disadvantages which become apparent over time.

In a sewage treatment plant system, sewage from a source, such as a home or building, travels via sewer lines directly to a sewage treatment plant where both the solid and liquid components of the sewage are treated. Many problems with existing sewage treatment plant systems are caused by the transport and treatment of solid sewage.

The transport of solid matter via sewer lines typically requires pumping equipment due to lack of gravity flow. Providing and using such equipment can be quite costly. If pumps malfunction or an excessive amount of solid waste exists, the solid matter may cause blockage in the sewer lines. In order to minimize blockage of solid matter, sewer lines tend to be large in diameter and consequently expensive.

Sewage treatment plants carry the great burden of receiving and treating all sewage coming directly from the sources. If excessive sewage is transported to the treatment plant, the treatment plant may overflow. Consequently, sewage enters and pollutes nearby rivers, bays and oceans, contaminating the waters and their organisms. The only way of preventing overflow thus far has been to either increase the capacity of the existing sewage treatment plant or develop an additional plant.

Furthermore, the treatment of solid sewage in a treatment plant incurs major costs. The prior art includes aerobic treatment, such as trickling filters, oxidation ponds and activated sludge processes, as well as tertiary sewage treatment through use of chemicals such as phosphates and inorganic contaminants. Use of these processes can consume a great deal of energy. Also, providing the necessary equipment to facilitate these processes is expensive. Therefore, what is needed is a system and a method for minimizing the transport of solid waste to sewage treatment plants, thereby reducing the amount of solid waste to be treated therein.

In a septic tank system, the septic tank functions to filter and treat the solid matter while the liquid sewage flows out from the septic tank via an effluent line to a leach field where the liquid matter is absorbed. Septic tanks are most commonly found in rural or outback areas away from downtown, urban areas. As rural areas become more densely populated, it becomes less feasible for each home or building to have its own septic tank and leach field. Consequently, the only solution being provided for a growing area having septic tanks is to develop a new sewage treatment plant that will accommodate the new sources of waste. Eventually, sewage treatment plants in rural areas will face the same problems as those in the city as demand exceeds the plants' capacities.

Sewage systems with septic tanks also exert great demand on the leach fields. In such a system, the septic tank filters out the solid matter while the liquid matter passes through the effluent line to the leach field. Since none of the liquid matter is treated, all of the liquid sewage travels from the septic tank to the leach field where the liquid sewage gets absorbed. If the leach field should become saturated, for example during times of heavy rainfall or excessive usage, it will be unable to absorb any more incoming liquid sewage, which could then overflow into and contaminate surrounding areas.

BRIEF SUMMARY OF THE INVENTION

In accordance with the present invention, both a system and method are disclosed which overcome these obstacles in the transport and treatment of sewage. A source of solid and liquid waste is coupled to a septic tank by an influent line. The septic tank is coupled to a sewage treatment plant by an outlet line, which may comprise an indefinite number of intermediary lines and valves. In the preferred embodiment, the outlet line comprises an effluent line coupled to the septic tank and a distribution line coupled to the sewage treatment plant. A valve may be disposed between the effluent line and the distribution line. The valve may be coupled to a leach field.

In operation, solid and liquid matter travel from the source to the septic tank. The septic tank filters out solid matter. Liquid matter passes through the septic tank and travels through the outlet line to the sewage treatment plant to be treated. Where a valve is coupled to a leach field and provided in between an effluent line and a distribution line, the liquid matter travels through the effluent line to the valve. The valve may then direct the liquid matter to the distribution line where the liquid matter is transported to the sewage treatment plant, or to the leach field where the liquid matter is absorbed.

The invention also comprises additional septic tank systems all coupled with the sewage treatment plant. The distribution lines of additional retrofitted septic tank systems may be coupled either directly or indirectly to the sewage treatment plant. In the case where the distribution lines are indirectly coupled to the sewage treatment plant, the distribution lines may be coupled to the valves of other retrofitted septic tank systems.

The invention also comprises methods for retrofitting a septic tank system, retrofitting a sewage treatment plant system, building a new sewage system, and transporting and treating sewage waste. The commonality between all these methods includes: transporting solid and liquid waste from a source to a septic tank; filtering out solid waste from the liquid waste with the septic tank; and transporting the liquid waste from the septic tank to a sewage treatment plant.

Many benefits result from the combination of a septic tank with a sewage treatment plant. Some of those benefits include minimizing the transport of solid waste to the sewage treatment plant, thus minimizing transport problems and reducing equipment costs. The invention also minimizes the treatment of solid waste by the sewage treatment plant, thereby reducing chemical and equipment costs as well as decreasing the potential for overflow and sewage pollution. Many more benefits will become readily apparent as this invention is applied to retrofit existing sewage systems.

The invention, now having been briefly summarized, may be better visualized by turning to the following drawings wherein like elements are referenced by like numerals.

The invention and its various embodiments can now be better understood by turning to the following detailed description wherein illustrated embodiments are described. It is to be expressly understood that the illustrated embodiments are set forth as an example and not by way of a limitation to the invention as ultimately defined in the claims.

DETAILED DESCRIPTION OF THE PREFERRED EMBODIMENTS

Figure 1:
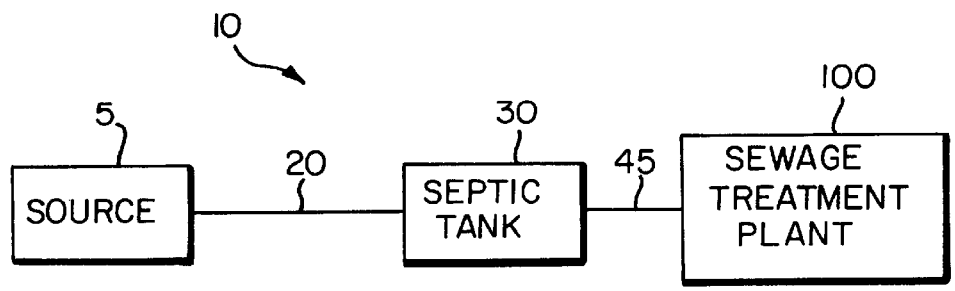
FIG. 1 is a schematic diagram of the base structure for the present invention.

A septic system according to the present invention is illustrated in FIG. 1 and designated by the reference numeral 10. FIG. 1 illustrates in a schematic diagram the base structure for the present invention 10. A source 5 of sewage is coupled to a septic tank 30 which is coupled to a sewage treatment plant 100. Throughout this entire specification including the claims, the word "couple" and conjugates thereof refer to the joining of two objects and includes both:

1) a direct connection of the two objects one to the other; and
2) an indirect connection of the two objects through an indefinite number of intermediary parts.

An influent line 20 couples the source 5 and the septic tank 30. An outlet line 45 couples the septic tank 30 and the sewage treatment plant 100. The source 5 may be any building containing a toilet or other waste receiving structure. An outline line 45 couples the septic tank 30 to a sewage treatment plant 100. Thus, in its simplest form, the invention 10 comprises the septic tank 30 coupled to the source 5 by an influent line 20, and an outlet line coupling the septic tank 30 and the sewage treatment plant 100.

Figure 2:
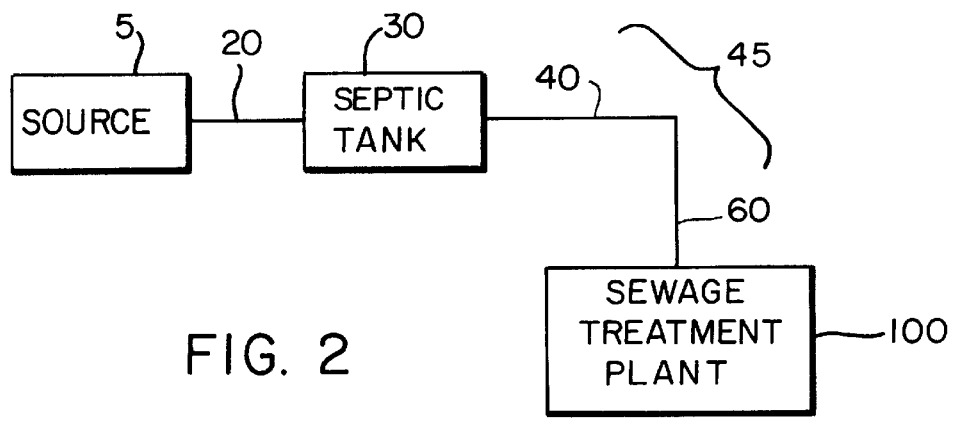
FIG. 2 is a schematic diagram of the present invention illustrating how the outlet line may comprise an effluent line and a distribution line.

FIG. 2 illustrates the same invention 10 wherein the outlet line 45 comprises an effluent line 40 adjacent to the septic tank 30 and a distribution line 60 adjacent to the sewage treatment plant 100. Having now described the base structure of the present invention, turn now to its operation.

The influent line carries the sewage waste, consisting of solid and liquid matter, from the source 5 to the septic tank 30. The septic tank 30 comprises one of those well known in the art. The septic tank 30 filters out solid matter from the sewage. Liquid matter travels from the septic tank 30 to the sewage treatment plant 100 via an outlet line 45. At the treatment plant 100, the liquid matter is then treated.

Many benefits result from the combination of a septic tank with a sewage treatment plant. Some of those benefits include minimizing the transport of solid waste to the sewage treatment plant, thus minimizing transport problems and reducing equipment costs. The invention also minimizes the treatment of solid waste by the sewage treatment plant, thereby reducing chemical and equipment costs as well as decreasing the potential for overflow and sewage pollution. Many more benefits will become readily apparent as this invention is applied to retrofitting existing sewage systems.

Figure 3:
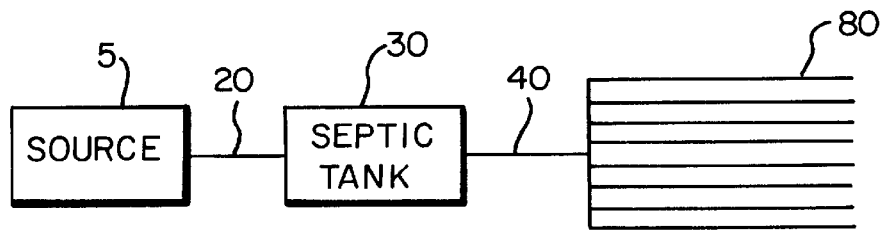
FIG. 3 is a schematic diagram of a prior art system.

FIG. 3 illustrates in a schematic diagram a prior art septic tank system. An influent line 20 connects the source 5 of sewage to the septic tank 30 which is connected by an effluent line 40 to a leach field 80. Sewage consisting of both solid and liquid matter travel from the source 5 to the septic tank 30 via the influent line 20. In the septic tank, the solid matter is filtered while the liquid matter travels through to the effluent line 40. The effluent line 40 carries the liquid matter to a leach field 80 to be absorbed.

Should the leach field in an existing septic tank system become saturated with liquid, such as during times of heavy rainfall or excessive drainage of liquid sewage, the leach field 80 may be unable to absorb the liquid matter from the effluent line 40. This excessive demand on the leach field 80 may lead to sewage pollution as the liquid sewage overflows into neighboring areas.

Since septic tank systems are most commonly found in rural areas away from the urban center of cities, many cities would find it desirable to annex the septic tank systems of those rural areas. The present invention 10 enables cities to annex existing septic tank systems to a sewage system having a sewage treatment plant.

Figure 4:
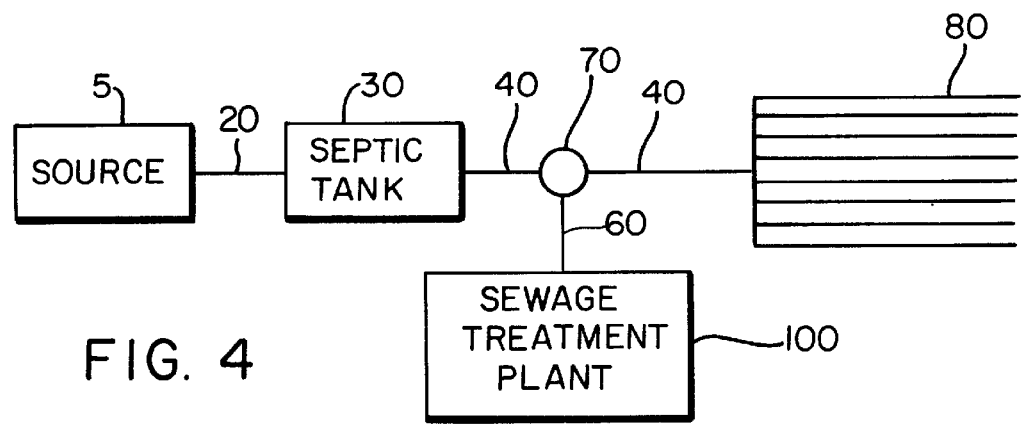
FIG. 4 is a schematic diagram of an existing septic tank system retrofitted with the present invention.

FIG. 4 is a schematic diagram of an existing septic tank system retrofitted to combine with the sewage treatment plant 100. A valve 70 is disposed in the effluent line 40 between the septic tank 30 and the leach field 80. A distribution line 60 couples the valve 70 and a sewage treatment plant 100. Thus, the valve 70 directs liquid matter from the septic tank 40 to either the leach field 80 or the distribution line 60. When directed to the distribution line 60, the liquid matter travels to the sewage treatment plant 100 to be treated.

Figure 5:
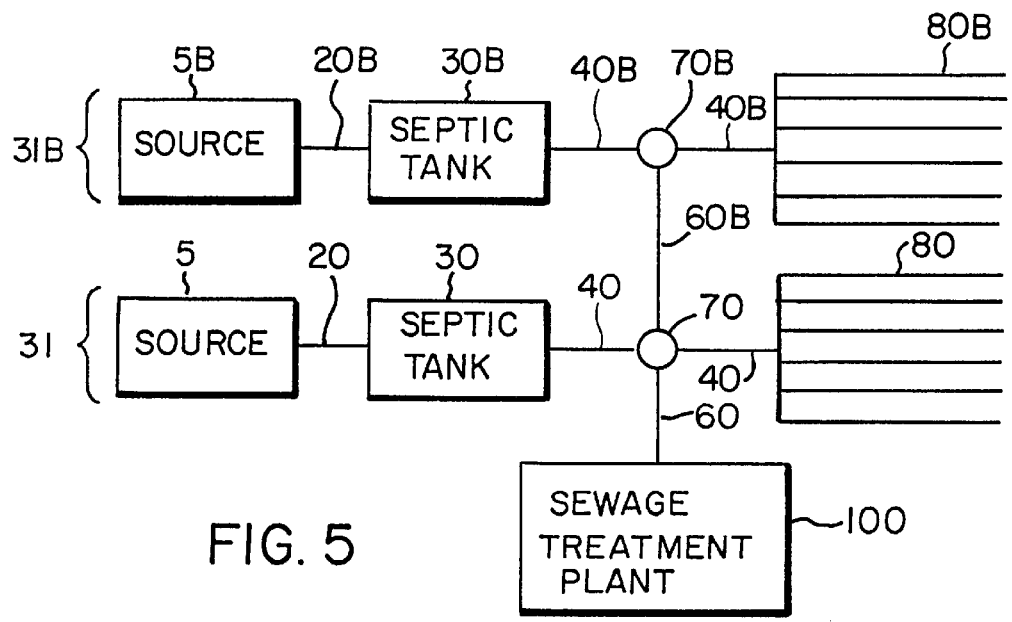
FIG. 5 is a schematic diagram of multiple septic tank systems retrofitted with the present invention.

FIG. 5 shows multiple septic tank systems retrofitted to combine the septic tanks with the sewage treatment plant 100. The primary retrofitted septic tank system 31 comprises the same elements as shown in FIG. 4, namely a primary source 5 coupled to a primary septic tank 30 by a primary influent line 20. The septic tank 30 is coupled to a primary leach field 80 by a primary effluent line 40. A primary valve 70 is disposed in the primary effluent line 40 between the primary septic tank 30 and the primary leach field 80. The primary valve is coupled to the sewage treatment plant 100 by a primary distribution line 60.

In a secondary retrofitted septic tank system, and subsequent systems, elements of structure similar to those previously discussed are designated by the same reference numeral followed by the respective letter "B", "C", etc. Thus, in the illustrated embodiment, the secondary retrofitted septic system is designated 31B and comprises a secondary source 5B coupled to a secondary septic tank 30B by a secondary influent line 20B. The secondary septic tank 30B is coupled to a secondary leach field 80B by a secondary effluent line 40B. A secondary valve 70B is disposed in the secondary effluent line 40B between the secondary septic tank 30B and the secondary leach field 80B. A secondary distribution line 60B couples the secondary valve 70B and the primary valve 70. Thus, the secondary retrofitted septic tank system 31B will have the same counterparts as the primary retrofitted septic tank system 31 except that the secondary distribution line 60B leading from valve 70B need not communicate directly with the sewage treatment plant 100. Instead, the secondary distribution line 60B is indirectly coupled to the sewage treatment plant 100 by communicating with the primary valve 70. Thus, the invention enables a multitude of septic tanks systems to be annexed since all that is required for each additional septic tank system is a corresponding valve disposed in the corresponding effluent line of that system, and a corresponding distribution line leading from the corresponding valve to the valve of a preceding retrofitted septic tank system. Therefore, only the primary retrofitted system 31 is required to have a distribution line 60 leading to the sewage treatment plant. It is to be understood that the term "primary retrofitted system" does not necessarily mean the septic tank system that was first in time to be retrofitted. Instead, the term is intended to designate the particular septic tank system which is retrofitted with the distribution line leading to the sewage treatment plant. Accordingly, the sewage treatment plant may communicate with multiple primary distribution lines corresponding to multiple primary retrofitted systems.

A configuration of multiple retrofitted septic tank systems operates in a manner similar to that of a single retrofitted septic tank system. Using the second retrofitted septic tank system 31B (in FIG. 5*a*) as an example, the valve 70B disposed in the effluent line 40B may direct liquid matter from the second septic tank 30B (hereinafter the "second liquid matter") either to its corresponding leach field 80B or to the distribution line 60B attached to the valve 70B. Since the distribution line 60B connects to the valve 70 of the first retrofitted septic tank system 31, the second liquid matter will travel to the valve 70. The first valve 70 may then direct the second liquid matter either to its corresponding leach field 80 or to its distribution line 60. When directed to the distribution line 60, the second liquid matter will travel to the sewage treatment plant 100 to be treated.

Figure 5A:
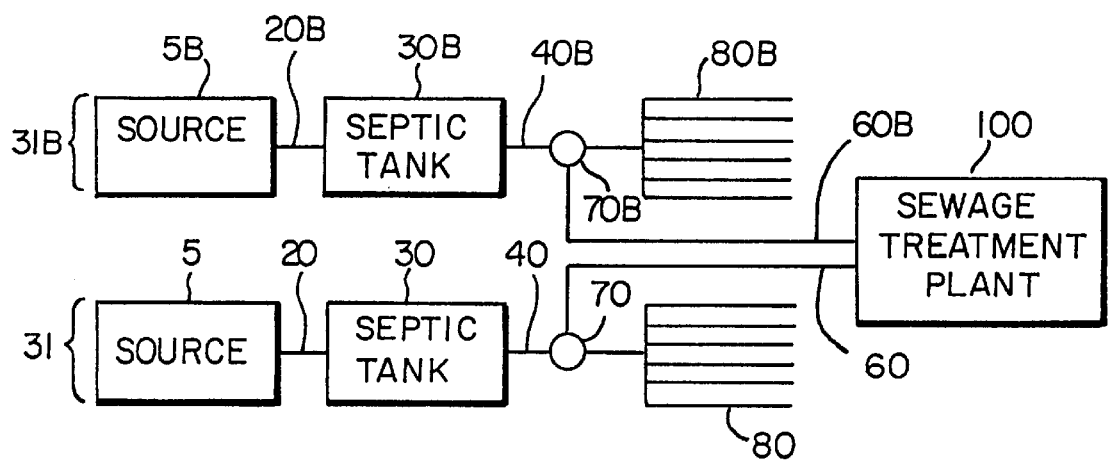
FIG. 5a is a schematic diagram of two septic tank systems retrofitted with an alternate embodiment of the present invention.

FIG. 5*a* is a schematic diagram of multiple septic tank systems retrofitted with an alternate embodiment of the present invention. In FIG. 5*a*, the distribution lines 60, 60B coupled to the valves 70, 70B of each retrofitted septic tank system 31, 32, respectively, may lead directly to the sewage treatment plant 100. It will become apparent that with each additional septic tank system, the number of variations in structure increases exponentially. FIGS. 5*b* to 5*e* show the possible variations of structure when a tertiary valve 70C and a tertiary distribution line 60C, corresponding to a tertiary retrofitted septic tank system (not shown), is added. The common feature in FIGS. 5*b* to 5*e* is that each valve is either directly or indirectly coupled to the sewage treatment plant 100 by a distribution line.

Figure 5B:
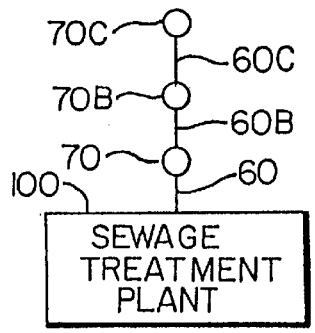
FIG. 5b is a schematic diagram of three retrofitted septic tank systems showing only the valves, distribution lines, and the sewage treatment plant.
Figure 5C:
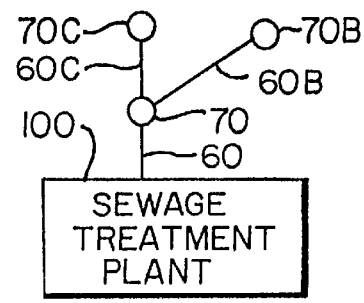
FIG. 5c is a schematic diagram of an alternate structure of three retrofitted septic tank systems showing only the valves, distribution lines, and the sewage treatment plant.
Figure 5D:
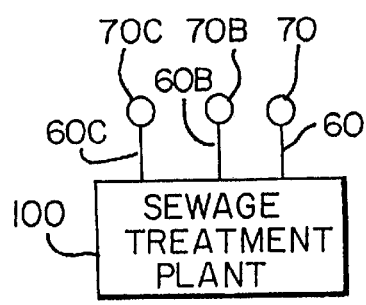
FIG. 5d is a schematic diagram of an alternate structure of three retrofitted septic tank systems showing only the valves, distribution lines, and the sewage treatment plant.
Figure 5E:
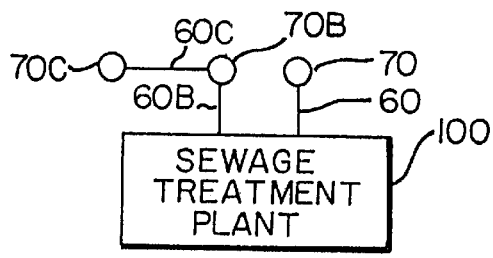
FIG. 5e is a schematic diagram of an alternate structure of three retrofitted septic tank systems showing only the valves, distribution lines, and the sewage treatment plant.
Figure 5F:
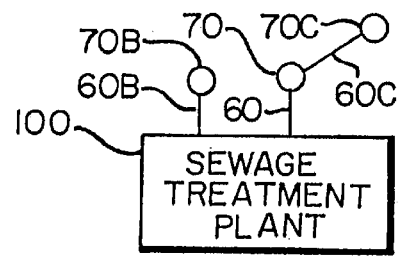
FIG. 5f is a schematic diagram of an alternate structure of three retrofitted septic tank systems showing only the valves, distribution lines, and the sewage treatment plant.

In FIG. 5*b*, the tertiary valve 70C is connected by a tertiary distribution line 60C that leads to a secondary valve 70B. The secondary valve 70B is connected by a secondary distribution line 60B that leads to the primary valve 70, which is connected by the primary distribution line 60 to the sewage treatment plant 100. In FIG. 5*c*, distribution lines 60C, 60B from valves 70C, 70B, respectively, all connect to the primary valve 70. The primary valve 70 is coupled to the sewage treatment plant 100 by the primary distribution line 60. In FIG. 5*d*, lines 60, 60B, 60C each couple their respective valves 70, 70B, 70C directly to the sewage treatment plant 100. In FIG. 5*e*, two distribution lines 60, 60B lead connect from their respective valves 70, 70B to the sewage treatment plant 100. A third valve 70C is connected by a third distribution line that may lead to either of the valves 70, 70B. In FIG. 5*e*, the third distribution line is connected to the second valve 70B. In FIG. 5*f*, the third distribution line is connected to the first valve 70.

Many benefits result from this retrofitting. The retrofitting relieves demand upon existing leach fields, thus decreasing, if not eliminating, the probability of sewage pollution resulting from liquid sewage overflow in saturated leach fields. Cities may now annex rural areas which contain only septic tanks and combine those existing septic tank systems with a sewage treatment plant, which already exists in most modern cities. Since primarily liquid, and not solid, matter is being transported from the existing septic tanks, the additional flow of the liquid matter to the sewage treatment plant will not create excessive demand on the plant.

Figure 6:
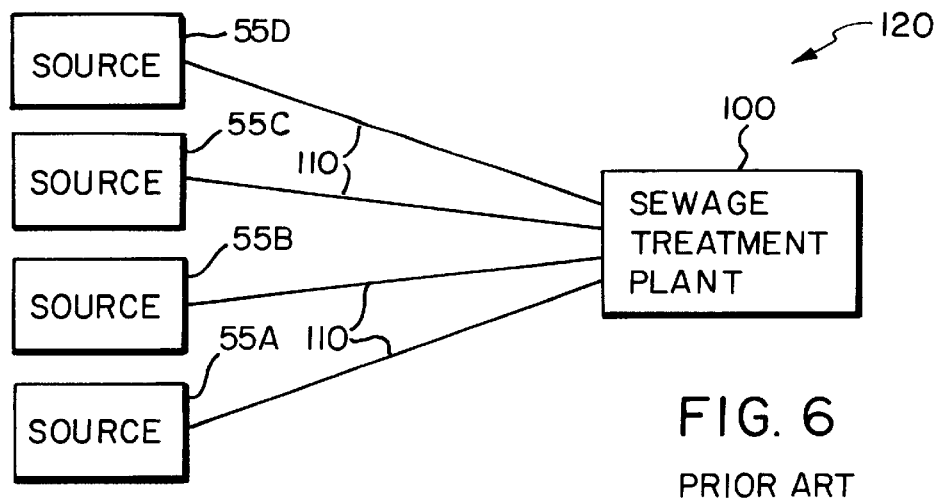
FIG. 6 is a schematic diagram of a sewage system of the prior art containing a sewage treatment plant.

The invention also comprises retrofitting a sewage system that includes an existing sewage treatment plant. FIG. 6 illustrates in a schematic diagram a prior art sewage system 120 containing a sewage treatment plant 100. Sewage consisting of both solid and liquid matter travel from the sources 55A–55D to the sewage treatment plant via outlet lines 110. Therefore, the sewage treatment plant system 100 treats both the solid and liquid matter of the sewage coming directly from the sources 55A–55D. As stated in the preceding Brief Description of the Prior Art, many problems and costs exist in the transport of solid waste to the sewage treatment plant and the treatment of solid waste by the sewage treatment plant.

Figure 7:
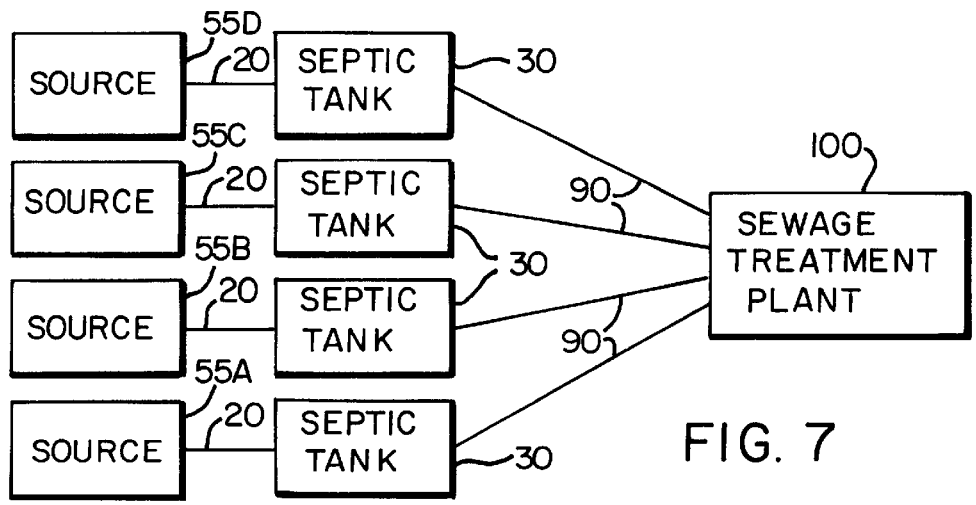
FIG. 7 is a schematic diagram of an entirely new sewage system as well as an existing sewage treatment plant system retrofitted with the present invention.

FIG. 7 is a schematic diagram of an existing sewage treatment plant system retrofitted with the present invention. A septic tank 30 is provided for each source 55A–55D of sewage. An influent line 20 couples each source 55A–55D to its corresponding septic tank 30. Each septic tank 30 is coupled to the existing sewage treatment plant 100 by an outlet line 90.

In operation, sewage consisting of solid and liquid matter travel from the sources 55A–55D to their corresponding septic tanks 30 via the influent lines 20. The septic tanks 30 filter out the solid matter as the liquid matter passes through. The liquid matter travel from the septic tanks 30 to the existing sewage treatment plant 100 via the distribution lines 90. By providing a septic tank for each source of waste, the amount of solid matter being transported to an existing sewage treatment plant is minimized. Thus, the distribution lines 90 can be smaller in diameter, and therefore cheaper, than existing distribution lines. The need for pumping equipment is reduced since most of the sewage being transported will be liquid matter. Less solid matter being transported to the treatment plant system also means less demand on an existing sewage treatment plant. This reduces the probability of sewage overload and any resulting pollution. Chemical and equipment costs can be saved as less solid matter is being treated.

Figure 8:
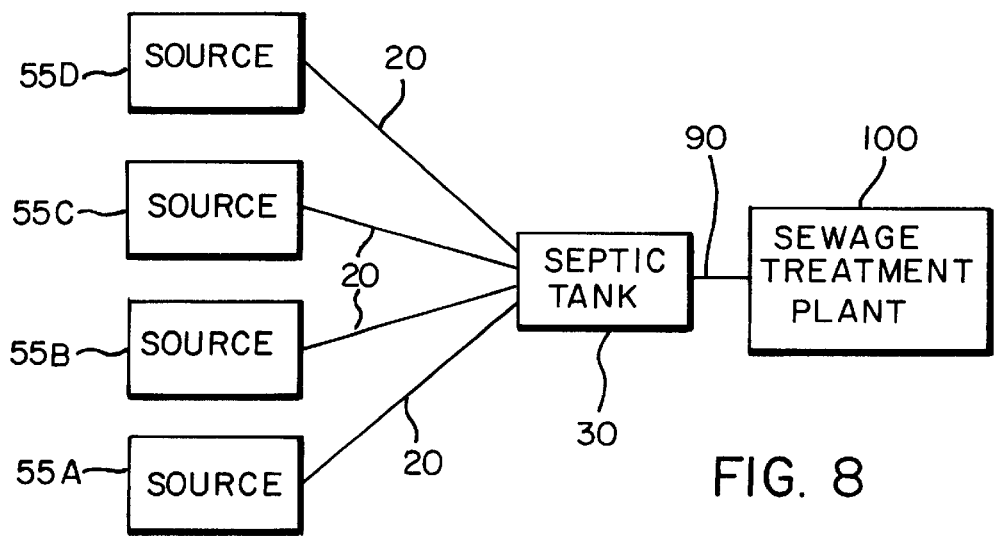
FIG. 8 is a schematic diagram of an entirely new sewage system as well as an existing sewage treatment plant system retrofitted with an alternate embodiment of the present invention.

FIG. 8 is a schematic diagram of an existing sewage treatment plant system retrofitted with an alternate embodiment of the present invention. Rather than providing a septic tank for each source (as shown in FIG. 7), a single tank may be provided for use with multiple sources. A distribution line 90 couples the septic tank 30 to the sewage treatment plant 100. In operation, sewage consisting of solid and liquid matter from all the sources 55A–55D travels to the septic tank 30 via the influent lines 20. The septic tank filters the solid matter from all the connected sources 55A–55D while the liquid matter travels through a distribution line 90 to the sewage treatment plant 100. Similar to the embodiment in FIG. 7, the sewage treatment plant 100 in FIG. 8 will receive and treat primarily liquid matter.

The sewage treatment plant 100 in both FIGS. 7 and 8 has been referred to as "existing" because the methods and structures described above have been directed toward retrofitting a sewage system that includes an existing sewage treatment plant. It is to be understood, however, that the invention also comprises an entirely new sewage system without any pre-existing elements. Therefore, FIGS. 7 and 8 also depict entirely new sewage systems.

In FIG. 7, the invention comprises providing new sources 55A–55D, new influent lines 20, new septic tanks 30, new distribution lines 90, and a new sewage treatment plant 100. Similarly, in FIG. 8, the invention comprises providing new sources 55A–55D, a new septic tank 30, a new distribution line 90, and a new sewage treatment plant system 100.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. The claims are thus to be understood to include what is specifically illustrated and described above, what is conceptionally equivalent, what can be obviously substituted and also what essentially incorporates the essential idea of the invention.

We claim:

1. A septic system for disposing of solid waste and liquid waste, the system comprising:

a septic tank for initially collecting both the solid waste and the liquid waste;

an outlet line coupling the septic tank and a sewage treatment plant, the outlet line being adapted to receive at least the liquid waste from the septic tank and to deliver the liquid waste to the sewage treatment plant;

wherein the outlet line comprises an effluent line and a distribution line, the effluent line communicating with an effluent port of the septic tank, the distribution line communicating with the effluent line and the sewage treatment plant, the distribution line receiving a first portion of the liquid waste from the effluent line and delivering the first portion of the liquid waste to the sewage treatment plant for processing the first portion of the liquid waste;

the septic system further comprising a valve disposed between the effluent line and the distribution line and a leach field coupled to the valve, the valve distributing a second portion of the liquid waste from the effluent line to the leach field.

2. The system of claim 1 wherein the valve comprises a check valve.

3. The system of claim 1 wherein the septic tank comprises a plurality of influent lines.

4. A method for retrofitting an existing sewage system in order to relieve demand upon a leach field and to cooperate with a sewage treatment plant, the existing sewage system having a septic tank coupled to the leach field by an effluent line, the effluent line receiving liquid waste from the septic tank and transporting the liquid waste to the leach field, the method comprising the steps of:

coupling a distribution line to the effluent line;

receiving a portion of the liquid waste from the effluent line into the distribution line;

coupling the distribution line to the sewage treatment plant; and transporting the portion of liquid waste in the distribution line to the sewage treatment plant.

5. The method of claim 4 further comprising the step of treating the portion of liquid waste in the sewage treatment plant.

6. The method of claim 4 wherein the step of coupling the distribution line to the effluent line comprises the step of disposing a valve in the effluent line, wherein the valve communicates with the effluent line and the distribution line.

* * * * *